(12) United States Patent
Hundscheidt et al.

(10) Patent No.: US 7,860,948 B2
(45) Date of Patent: Dec. 28, 2010

(54) HIERARCHICAL CACHING IN TELECOMMUNICATION NETWORKS

(75) Inventors: Frank Hundscheidt, Kerkrade (NL); Heino Hameleers, Kerkrade (NL)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 1735 days.

(21) Appl. No.: 10/490,841

(22) PCT Filed: Sep. 3, 2002

(86) PCT No.: PCT/EP02/09796
§ 371 (c)(1),
(2), (4) Date: Mar. 25, 2004

(87) PCT Pub. No.: WO03/030486
PCT Pub. Date: Apr. 10, 2003

(65) Prior Publication Data
US 2004/0255016 A1 Dec. 16, 2004

(30) Foreign Application Priority Data
Sep. 26, 2001 (EP) .................................. 01122993

(51) Int. Cl.
*G06F 15/16* (2006.01)
(52) U.S. Cl. ............ 709/219; 455/414.2; 707/999.102; 707/E17.12; 379/219
(58) Field of Classification Search .................. 709/203, 709/216, 217; 455/456.5; 707/999.102
See application file for complete search history.

(56) References Cited

U.S. PATENT DOCUMENTS

| | | | | |
|---|---|---|---|---|
| 5,530,799 A | * | 6/1996 | Marsh et al. ................. | 711/118 |
| 6,167,438 A | * | 12/2000 | Yates et al. .................. | 709/216 |
| 6,594,260 B1 | * | 7/2003 | Aviani et al. ................ | 709/203 |
| 6,810,259 B1 | * | 10/2004 | Zhang ..................... | 455/456.5 |
| 6,874,017 B1 | * | 3/2005 | Inoue et al. ................. | 709/217 |
| 7,272,613 B2 | * | 9/2007 | Sim et al. ............. | 707/999.102 |
| 2001/0056416 A1 | * | 12/2001 | Garcia-Luna-Aceves .... | 709/232 |

(Continued)

FOREIGN PATENT DOCUMENTS

GB 2345993 7/2000

OTHER PUBLICATIONS

Tewari, et al. "Design Considerations for Distributed Caching on the Internet" 19th IEEE International Conference on Distributed Computing Systems, 1999.*

*Primary Examiner*—Dustin Nguyen

(57) ABSTRACT

The invention addresses the field of mobile communications. It relates to a method, network node and computer program for management of cached information within a hierarchical structure. The basic approach is to provide an intelligent mechanism for more dynamic management of the cached contents. In particular it provides a solution for a more efficient utilisation of the storage resources in a caching architecture by caching a single cached copy of the same content on each path from a client to the original source in the hierarchical architecture. This basically means that the cached information is placed as high up the hierarchy as necessary, but that the mechanism is enhanced with the capability to also move the cached information down the hierarchy in case the content is mainly used on a regular base by hosts connected to a part of the hierarchical architecture. The dynamics of the proposed solution foresees also to replicate a cached content to more then one part of the hierarchical architecture.

25 Claims, 4 Drawing Sheets

U.S. PATENT DOCUMENTS

2002/0015042 A1* 2/2002 Robotham et al. .......... 345/581
2002/0147770 A1* 10/2002 Tang .......................... 709/203
2007/0276928 A1* 11/2007 Rhoads et al. .............. 709/219

* cited by examiner

Prior Art

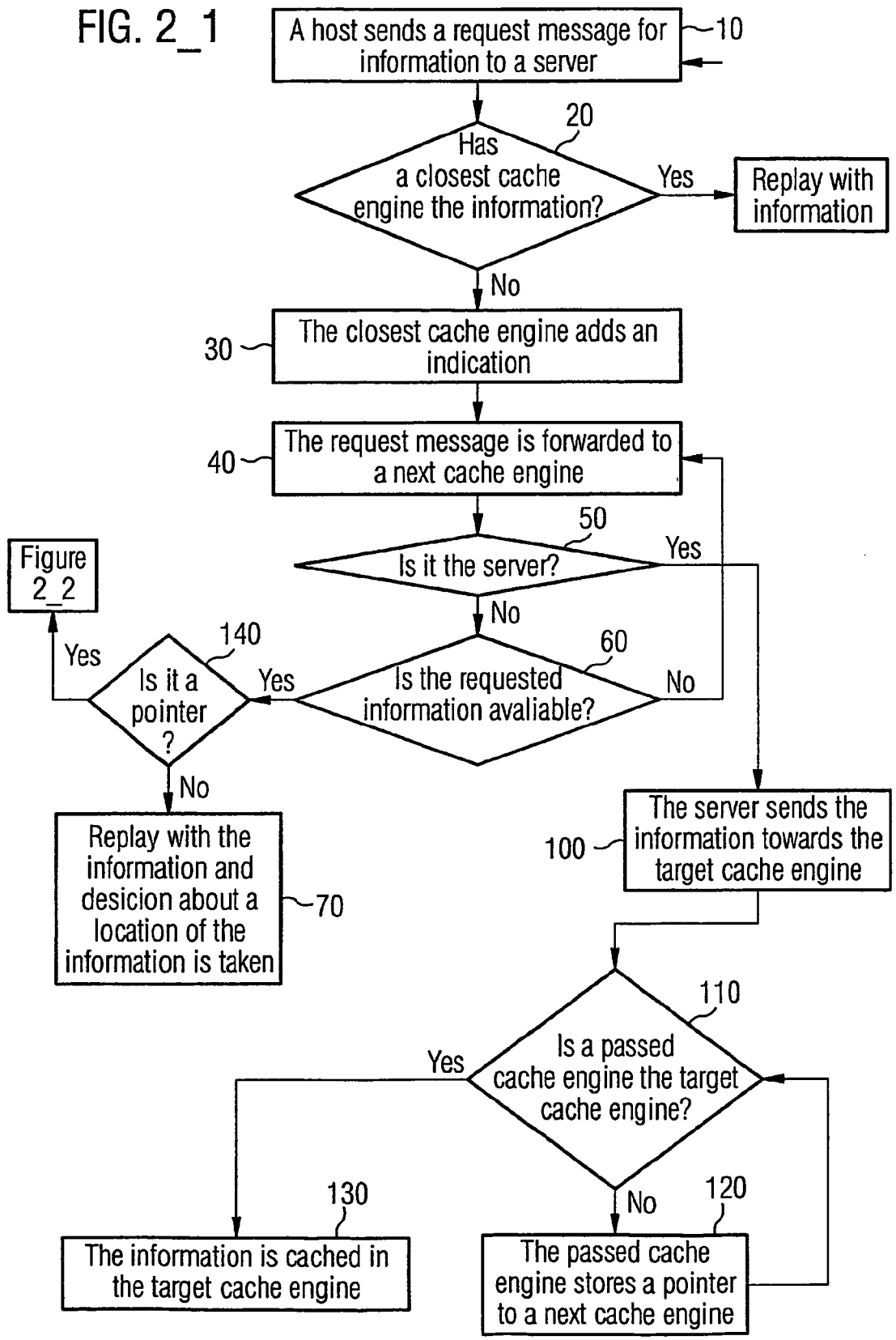

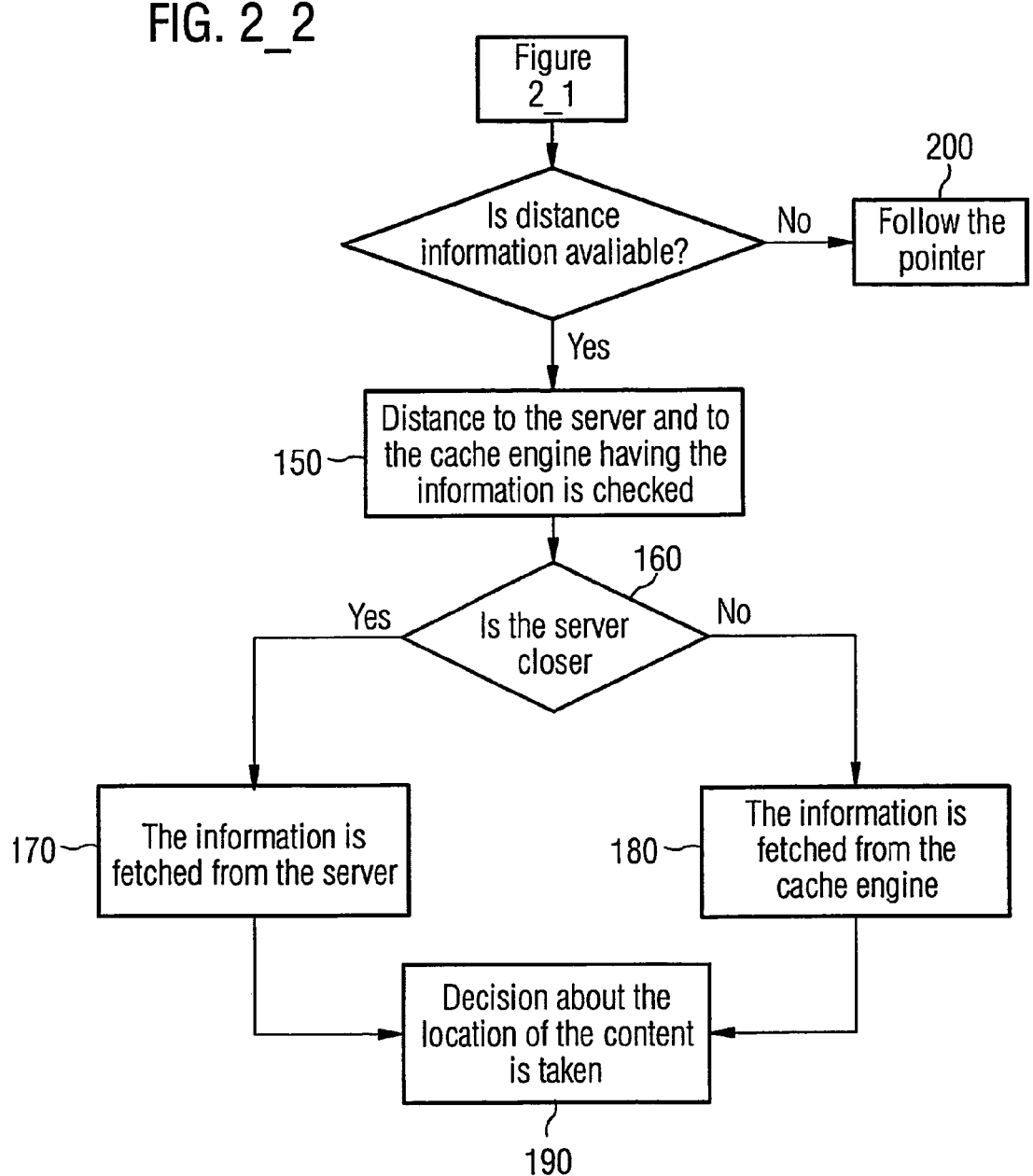

HIERARCHICAL CACHING IN TELECOMMUNICATION NETWORKS

TECHNICAL FIELD OF THE INVENTION

Background

The volume of Internet traffic increases rapidly, although a large percentage of that traffic is redundant. This occurs, because multiple users request much of the same data. This means that a significant percentage of the network infrastructure carries identical requests and subsequent identical content as the answer. Eliminating a significant amount of telecommunications charges offers an enormous savings opportunity for enterprises and service provider customers.

One of the possible solutions for reducing transport of the redundant data is by applying a caching mechanism. The caching mechanism reduces the amount of network traffic by taking advantage of the locality feature for accesses. In this model, if the data requested by a client is not present locally, it is copied from the server's node to a node located closest to the client and is cached there. The client's request is processed on the node closest to the client by using the cached data. Recently accessed data are retained in the cache for some time so that repeated accesses to the same data can be handled locally. Thus, the caching is a technique of keeping frequently accessed information in a location close to the requesters.

The advantage of the caching mechanism is that this method avoids unnecessary network accesses, which results in reduction of network transmission and access times. For the Internet, which is an example of a Wide Area Network WAN it means bandwidth reduction and for the end user improved productivity due to the short access time.

In case of the Internet a so-called Web-cache can store web contents on a storage device that is physically or logically closer to the user. This results in a faster lookup of the web contents in the Internet.

To limit bandwidth demand caused by the uncontrolled growth of Internet use, vendors have developed applications that extend local caching to the network level. The current main type of network-level caching products are proxy servers. These are software applications that run on general-purpose hardware and operating systems. A proxy server is placed on hardware that is physically between a client application, such as a web browser, and a web server, on which the requested web contents are available. The proxy server acts as a gatekeeper that receives all packets destined for the web server and examines each packet to determine whether it can fulfil the request. If it can not fulfil the request it forwards the request to the web server. Otherwise the requested web content is delivered to the client application directly from the local storage of the proxy server. Proxy servers can also be used to filter requests, for example, to prevent employees from accessing a specific set of web sites.

Unfortunately, proxy servers are not optimised for caching, and they fail under heavy network loads. In addition, because the proxy server is in the path of all user traffic, two problems arise. The traffic is slowed to allow the proxy server to examine each packet, and failure of the proxy software or hardware causes all users to lose network access. Further, proxy servers require configuration for each user's web browser. Expensive hardware is required to compensate for low software performance and the lack of scalability of proxy servers.

A solution for the mentioned problems is described in "Web Cache Control Protocol", Version 1.7, Cisco technical documentation, Sep. 16, 1998. This document includes a description for a cache engine, which is designed as a loosely coupled, multinode network system, optimised to provide robust shared network caching. The cache engine solution comprises the Web Cache Communication Protocol and one or more cache engines that store the data. The Web Cache Communication Protocol defines the communication between the cache engine and the router. Using the Web Cache Communication Protocol, the router directs only web requests of the end user to the cache engine rather than to the intended server. The router also determines cache engine availability, and redirects requests to new cache engines as they are added to an installation. In case a user accesses first time a web content this request is sent to the router, which interprets the request. According to the Web Cache Communication Protocol the router intercepts web traffic on the Transmission Control Protocol TCP port 80 and routes it to the cache engine. The cache engine checks, whether it has the requested web content. If it is not the case the web content is requested from the corresponding web server. While the page is being transmitted to the user, the caching system saves the page and all the associated graphics on a local storage device of the cache engine. That content is now cached for the following requests of the same web content, and there is no need to send the request over the Internet. Instead of this the web cache system delivers the web content from local storage. The cache engines are transparent to the user and to the network operations.

In general the caching method guarantees, in case the same content is accessed more than once, an efficient usage of the network resources, but on the other hand this solution introduces inconsistency into the network. This important task of ensuring up-to-date data is addressed in a variety of ways, depending on the design of the system.

The corresponding nodes of the system providing the caching can be arranged in such way that they build a hierarchical architecture. Within the hierarchical architecture a hierarchical caching is performed.

A hierarchical caching is described in respect to FIG. 1.

FIG. 1 depicts the state of the art algorithm for the hierarchical caching. The hierarchical architecture presented in FIG. 1 includes routers, R1 to R10. A cache engine CE1 to CE5 is connected to some of the routers. The cache engine has the above-described functionality for storing the cached information. The routers are used for routing a request message for information from the hosts to the server and to route the requested information from the server to the hosts. The router R1 fulfils the functionality of a server, which is connected to the Internet. Hosts are devices with client applications used by the clients and are located at the bottom of the hierarchical architecture and they are connected to the routers.

The problem, which occurs with the existing mechanisms for a hierarchical caching, is that the same cached information is stored at several locations in the hierarchy. In respect to FIG. 1 in case that the router R1 or R2 requests a web content, the cache for this web content will be placed in cache engine CE1 as the closest node. However, if router R3 or router R4 requests the same web content afterwards, the web content will be copied into cache engine CE 2, meaning that both cache engines CE 1 and CE 2 will contain the same data. Another example for the mentioned problem occurs when router R3 requests some web content, then the cache for this content will be placed in cache engine CE2. However, if router R1 or R2 request the same web content afterwards, the content will be copied into cache engine CE1, meaning that both cache engines CE1 and CE2 will contain the same data. It means in both examples the same cached information exists in two different cache engines. This concept provides a rigid solution for management of the cached information.

Further since there may be several cached copies of the same data, there is also a need for providing a mechanism for updating the cached information. In particular it is necessary to update the same cached information at all locations containing the same cached content. One possibility is a flooding of web content. In order to carry out the flooding either web content update messages or each cached content needs to request an update from the server in the Internet. This is quite large-scale since each cache engine higher up the hierarchy will refresh the cached contents in the lower layers. Another solution is to remove the cached content after expiring of certain time limit. However this is very inefficient for data that is seldom changed and there is not much to gain from the caching since the data can not be cached for a long time. The decision of the applied caching mechanisms is taken either by the administrator during the configuration of the system, this means that the experience or service usage expectations are considered or the general defined caching mechanisms are used. It means the decisions of the caching algorithms are very statically.

SUMMARY AND DESCRIPTION OF THE INVENTION

It is an object of the present invention to provide a solution for dynamic management of the cached contents. In particular it is an object of the present invention to provide a solution for an efficient utilisation of the storage resources in a caching architecture.

The proposed method has the advantage that a dynamic handling of the cached information is performed in order to simplify the update or the refresh procedures and to store possibly only one cached copy per a part of the hierarchical architecture. The cached information can be moved up and down within the hierarchical architecture depending on the usage frequency of the information. This basically means that the cached information is placed as high up the hierarchy as necessary, but that the mechanism is enhanced with the capability to also move the cached information down the hierarchical architecture in case the content is mainly used on a regular base by lower hosts. For this purpose access statistics for the cached information for a location within the hierarchical architecture is established and by receiving a request for the cached information the access statistics of at least one other location is checked and according to the access statistics the location of the cached information within the hierarchical architecture is determined. An example of hierarchical architecture is in form of a tree and in this example a part of the hierarchical architecture is called a sub-tree. Within the network topology an access network, like for example Wireless network or Local Area network LAN connected to a core network stands for a sub tree. The smallest sub-tree is an individual network node. With this definition the access statistics can be performed for a network node or for a sub tree, having multiple network nodes. In the last case the node on the top of the sub tree can store the access statistics for the sub tree. The term location is used as a general description for a network node within the hierarchical architecture. It means the location can be a sub-tree having one or more network nodes, wherein the network node can be a router, a host, a server or a cache engine.

The access statistics can be evaluated either in the cache engine connected to a router or in a router. The router is responsible for routing the information within a hierarchical architecture. Also in a server, which is on the top of the hierarchical architecture the evaluation of the access statistics can be performed.

In an advantageous embodiment of the method the cached information either remains in the actual cache engine or the location of the information is changed by moving it up or down to other cache engine within the hierarchical architecture. The cached information can be also replicated when regularly access statistics of the same information by multiple cache engines is determined.

The dynamics of the proposed solution foresee also to replicate a cached content to more than one part of the hierarchical architecture when the accessing statistics indicate frequently access to the same information by multiple cache engines.

It is proposed that in case the determination of the location results in changing the location, the cache engine stores a pointer to the location of the information. The location can be either a node or a subtree. The pointer can show at the next node, for example within the tree it shows either at the right or the left node. In this case in order to retrieve the address of the cache engine having the content a retrieval message is to be sent down the tree according the pointers. It is also consider to store pointers showing the direction within the tree, for example right or left and additional the pointer to the node with the content. In this case it is required to update the pointer along the tree towards the server at the corresponding locations in case the content is moved.

It is proposed that the access statistics consider the number of accesses per time unit and the number of hosts for a content. The evaluation of the access statistics can be enhanced by additional parameter, like for example the distance or the priority of the node or the sub tree. In order to save the network resources a location can be determined that suites to the accessing nodes regarding the distance. In case that one sub tree is for example a wireless access network with high networks delays it can be decided that this subtree receives higher priority and by determination of the location this priority is considered in order to reduce the anyhow high delays.

Within a hierarchical architecture cache engine being closer to the user and cache engines located higher up in the hierarchy in relation between a server and a host can be determined. In an advantageous embodiment in case an information is mostly used by a requesting host then the caching of this information is performed as close to the host as possible. In order to achieve this a cache engine closest to the host adds an indication to the request message received from the host indicating the wish of caching the information. This request message with the indication is forwarded to a next cache engine.

In a preferred embodiment the cached information is located as high in the hierarchical architecture as possible in case different hosts request the information. In order to perform this the cache engine located higher up in the hierarchical architecture overrules the indication set in the request message by the cache engines located lower indicating that it has the wish to cache the content.

The access of the cached information preferably includes the following steps. At first the host sends a request message for information towards the server. The next passed cache engine checks if it has the requested information and in case of having the information available this information is returned and the usage of the information by other hosts connected to this cache engine is checked and considering the result a decision about the location of the information is taken. In case the next passed cache engine has a pointer to the location of the information the request message is forwarded to the location or in case the next passed cache engine does not have the information the request message is forwarded to the next cache engine.

It is proposed that the pointer to the location of the information is accompanied with additional information like caching time, cache refresh rate and a distance indication to the cache engine in the router laying lower in the hierarchical architecture.

In an advantageous embodiment in case a cache engine has a pointer to the location of the information the distance to the cache engines having the cached information is compared with the distance to the server and in case the distance to the server is shorter then the information is fetched from the server. An advantage of this solution is that the information from the original server is always up to date, whereas the cached content from a cache engine may be outdated.

It is preferably to consider a so-called cache refresh likelihood information. This information indicates the likelihood that the cached content is changed within a certain timeperiod. It may for example be used to decide whether the caching tree architecture as described below is efficient or not. This information should be available from the content or content provider and can be added by establishment of a content. Such an indicator could for example be added to the HTTP protocol.

It is proposed that in order to update the cached information a refresh mechanism is carried out. This mechanism can be either performed with a pushed-based concept initiated by the server or with a pull-based concept initiated by at least one cache engine. With the first possibility the server sends an updated version of the content along the tree by considering the pointers. This avoids the necessity of flooding the whole tree for every update.

In a preferred embodiment the refresh likelihood is considered by performing the refresh procedure. This parameter can be used to determine the time between cache refreshes. In case a content is updated for example on average once a month, there is no need for refresh every second. Usually this information is not available and therefore all contents are to be treated the same.

It is also proposed that a removal of the cached information is done with an additional message to the cache engine or automatically since it is outdated or by performing the next refresh mechanism.

In a preferred embodiment the establishment of the hierarchical architecture is done with a multicast and a corresponding multicast delivery tree topology. This are well known mechanisms, which can be used for this purpose.

As an alternative the establishment of the hierarchical architecture is done with a routing protocol. With this protocols the information about the route between the server and the clients can be obtained. An example of the routing protocol is a distance vector routing protocol containing a table with the shortest paths to all nodes within a network.

The network node contains a collecting entity for collecting data about the usage of the cached information within a part of the hierarchical architecture, a statistics entity for determining of a access statistics for the cached information from the collected data and an analysis entity for analysing the access statistics in order to determine the location of the cached information within the hierarchical architecture.

Preferably the access statistics are administrated in the cache engine. This task can be also performed by the server or by the router.

The nodes with the above mentioned characteristics build a system. Preferably the hierarchical architecture of the system has a form of a tree with at least one server on the top of the tree, with at least one host as a leaf of the tree, and in-between with at least one router and with at least one cache engines, which store cached information and is connected to a corresponding router.

Preferably the establishment of the tree is done by means of the multicast routing protocols. These are well known protocols, which are defined for the mentioned purpose. This implies that no additional calculations and transmission are required for the caching tree, since it is based on the multicast delivery tree.

A computer program, loadable into the internal memory of a digital processing unit, comprising software code portions adapted to control the method of the invention, when the computer program is executed on the digital processing unit. Especially, parts of a program unit according to the invention can be embodied by a software function, which is called by performing a request message and carried out in the nodes passed towards the server. The unit comprises code for reception of the message, for investigation of the location of the information and for taking the decision about the location according to the access statistics. A corresponding code unit also evaluates the access statistics.

The foregoing and other objects, features and advantages of the present invention will become more apparent in the following detailed description of preferred embodiments as illustrated in the accompanying drawings.

DETAILED DESCRIPTION OF PREFERRED EMBODIMENTS

Figure 1:
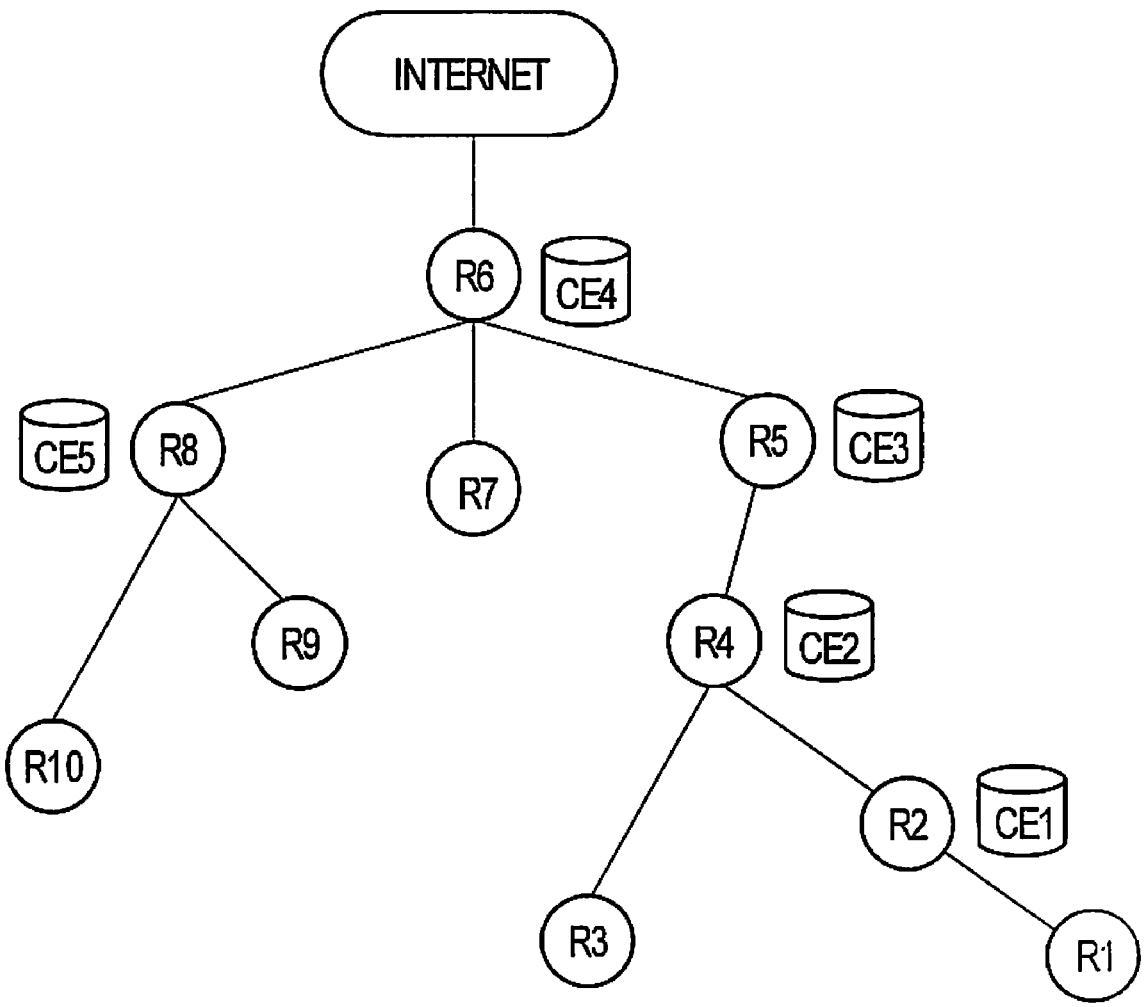
FIG. 1 shows a state of the art network architecture for the hierarchical caching, FIG. 2_1 and 2_2 show a flow diagram for accessing a cached information according to the invention.

A communication network foreseen for performing a cache mechanism has routers, which are connected in such way that they and their connections relate in a hierarchical architecture, for example in form of a tree with at least one server on the top of the tree and at least one host as a leaf of the connection tree. Further said network has cache engines, which store cached information and are connected to the corresponding routers. In the following description this hierarchical architecture will be called a caching tree. A part of the hierarchical architecture, which can either consist of one router and at least one corresponding host or of a router with further routers connected to this router is called a sub-tree.

The tree structure can be established for example during the network configuration, which can be done either by the network administrator or by the Internet Service Provider. The establishment of the tree can be done by means of multicast routing protocols, which are used for building multicast distribution trees. The examples of the multicast distribution trees are spanning tree, shared trees, source based trees or core based trees. A detailed description of these trees can be found in "IP Telephony:Packet-based multimedia communications systems" by Hersent, O., Gurle, D., Petit, D., Addison-Wesley, Harlow, 2000. The tree can be built either between the cache engines or between the routers associated to these cache engines.

The communication between two nodes within a tree structure, which is required to apply caching can be performed by means of a point to point protocol. The requirement of such protocol is the possibility to send a signaling message between the communicating nodes informing these nodes about the subsequent operation. For example in order to move a cached content a signaling message is sent and afterwards the cached content is moved. Other operation belonging to the cache mechanism is the deleting of a cached content as a consequence of a cache refresh message. These requirements of such kind of a point to point protocol are fulfilled for example by the different application protocols like HTTP, which can be enhanced with the corresponding inter cache engine communication, by the Transmission Control Protocol TCP or by a dedicated protocol between the cache engines. The last-mentioned protocol has the advantage that it can be updated with smaller effort in comparison for example to HTTP.

In the following an overview of the operation belonging to cache mechanisms, among other the content request handling, the content return handling, the content refresh handling, the moving of the content, the content replication and the access statistics handling required for carrying out the present invention is given.

In particular in the following paragraph the request handling for accessing a cached information and the content return handling in a communication network with a hierarchical architecture is described in respect to FIG. 2.

In step 10 the host sends a request message for information to the server. The request is sent up the caching tree until the cache engine closest to the requesting host is reached. The closest engine checks if it has the requested information available, 20. In case of having the information the cache engine closest to the requesting host sends it back, otherwise it adds an indication to the request message that this node wants to store the requested information, 30. This node stores also the notification that it wants to cache the content. This notification can be either a flag or an address. The request message with the added indication is forwarded 40 towards the server, 50 to the next cache engine, which checks the availability of the requested information, 60. This node either has the requested information, or it has a pointer to the location of the requested information, 140 or it has none information regarding the required content. In case this node has the requested information available a check of the usage of the information by other hosts connected to this cache engine is performed, 70. For example in case the usage expressed in access statistics is low the requested information is moved to the cache engine closest to the requesting host. Otherwise, when the usage of the cached content is high, the actual cache engine can decide to keep the content, in this case it returns the required content and additional it sends a notification of keeping the cached information. It can also decide to replicate the content among the cache engines or to move it up the tree in case other sub-trees access the content also very regularly.

Further a cache engine higher up in the tree can decide to overrule the indication of a lower cache engine indicating that it wants to cache the content. The reasons for an overruling may be that the higher cache engine currently has the cached content and does not want to give it away, for example because of the access statistics, which show that the cached content is used by multiple subtrees. This cache engine still remains the responsible node for refreshing the cached content from the original server. If the indication is overruled, the corresponding cache engine that has overwritten the indication must inform the cache engine that set the indication about the modification.

In case the current cache engine does not have the requested information available, 60 the request message is forwarded up the caching tree, 40 until the server is reached, 50. The server returns the requested information and sends it towards the cache engine that last set the indication of wanting to have the content, 100. Further this node will be called target cache engine. The target cache engine caches the information, 130. The cache engines passed on the way down, 110 store an indication, for example a pointer to a sub tree where the web content is to be found, 120. Further the pointer to a sub tree and a pointer to a node are to be considered equivalent.

In case of a request for the same content, this pointer is used to find out the location of the content within the tree, 140, in case the pointer is accompanied by a distance information. If a cache engine receives a request and it has a pointer to the content and the distance information, it can compare the distance to the server and to the cache engine within a sub-tree, which has the requested information available, 150. In case the distance to the server is shorter then to the sub tree, 160 the content is fetched directly from the server, 170. The server can check the frequency of the usage of this information. After taking into consideration the access statistics the server decides about the location of the content, 190. When the usage is low the content can be moved down the tree. The server can also decide to keep the information and to overrule any indication. This can be an advantage when the information is being updated often. The server can also decide to replicate the information to one or more subtrees.

In case there is no distance information the request message is forwarded according to the pointer, 200.

In case the requested information is located in a node or a sub-tree closer to the current cache engine than to the server this information is fetched from the sub-tree, 180. When the information is often used within the sub-tree then a decision can be taken 190 to keep the information and to merely replicate it to the requesting cache engine. By a low usage of the requested information within the sub-tree it is preferable to move the information higher up in the hierarchical architecture. In this case the node or the sub-tree gets an indication that the content can be removed, since it is now stored higher up in the tree.

Figure 3:
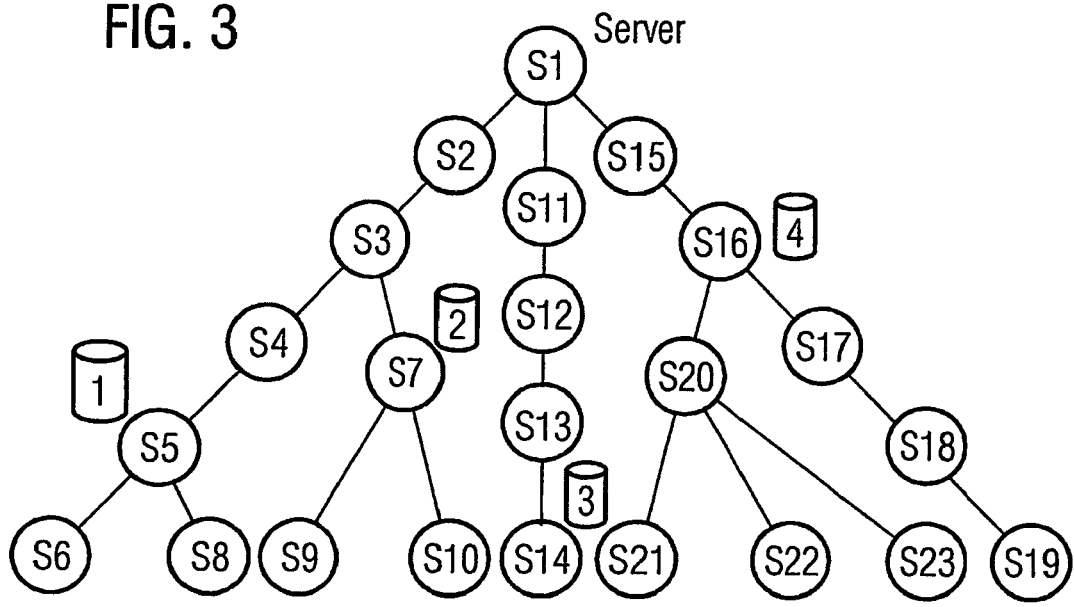
FIG. 3 shows a hierarchical caching architecture.

In the following an embodiment of the invention with a caching tree in respect to FIG. 3 is presented.

The FIG. 3 presents an example for a caching tree having routers, denoted by S, hosts or clients denoted with C and four cache engines having the numbers 1 to 4. The router S1 is the source of the information, for example a web server. A caching tree is established between the web server, which provides the web content to the clients C1 to C7, which access the content. The routers S5, S7, S14, and S16 contain cached content. The routers can be enhanced by cache engine responsible for storing and managing the cached information.

The establishment of the caching tree can be done with different methods. For example since multicast is an efficient transmission mechanism for providing content to multiple receivers, the caching tree can be based on the corresponding multicast delivery tree topology that is established by means of the multicast routing protocols like this is described above. This implies that no additional calculations and transmissions are required for the caching tree, since it is based on the multicast delivery tree, which is optimized for transport from one or more sources to multiple destinations. Examples of a multicast delivery tree, are based on well-known algorithms, like for example multicast spanning trees.

In case an optimized multicast delivery tree is not established, a routing protocol may be used to get access to information about the route between the server and the clients. Distance vector routing protocols contain a table with the shortest paths to all destinations, for example within a network. A detailed description of the distance vector routing protocols can be found in Tanenbaum, A. S., Computer Networks, Third Edition, Prentice-Hall, N.J., 1996. The shortest path is based on the used metric, like for example delay. The metric that is of importance can be specified by the service. The service is for example a webpage and the service provider who can be for example the provider or the owner of the corresponding webpage. In this case it is his responsibility to specify that for example delay because of the fast access or bandwidth because of the high-speed access is important and is to be considered as metric.

In the FIG. 3 the router S19 can have the information that the path towards the server S1 consists of the routers S18, S17, S16, S15. According to this information the router S19 assumes that all routers are able to cache the content coming from the server S1. It does not matter whether any of the routers is not able to cache the content, since the router S19 will relay all content requests upwards towards the server. The router S19 also does not care whether the content is actually provided by the server itself or any other router on the path to the server S1.

In the following a flow of the information in respect to FIG. 3 is described.

The client C7 sends a request message, for example a content request. This request message is routed via the routers S19, S18, S17 and is sent by S16 to cache engine 4. Cache engine 4 checks whether it has the content cached. In case it has, the cashed content is returned to C7. Before returning the content the cache engine has the possibility of checking whether the content is still up to date. If the cache engine 4 does not have the requested content, the request if forwarded via the routers S16, S15 to the server S1. The server returns the content and router S16 forwards it to cache engine 4 where the contents are cached. In case the client C7 is the first client accessing the server, the content is cached in a cache engine close to the client. If S19 would have a cache engine, the content would have been cached in there. An indicator, like a pointer to the cached content would be stored in S16, since it has multiple paths towards different clients. Basically, there are two options for the realization of fetching of the content.

In the first scenario according to FIG. 3 the router S16 stores a pointer optionally accompanied by additional information like for example caching time or cache refresh rate and a distance indication to the cache engine in the router S19. The information of the distance may be retrieved from the corresponding routing protocols, which provide more accurate and up-to-date information. The distance to the original server S1 and to the cache engine in the router S19 is compared whenever one of the clients C4 to C7 accesses the content. In case the distance from the router S16 to the original server S1 is shorter than the distance to the router S19, then the information is fetched from the original server. An additional benefit is the fact that the information from the original server is always up to date whereas the cached content may be outdated. Once the content is fetched from the original server, it is cached in the router S16. The cached content in the router S19 may be deleted directly with an additional message sent to the router S19 or it may just be kept until it needs to be refreshed or removed automatically since it is outdated. The mechanism to be applied depends on the cache update procedures used. The same mechanism is to be applied in case the cached information is managed by cache engine.

In another scenario for fetching a content the cached content is always fetched for simplicity reasons from the router S19 when a client from the left branch of the caching tree for example client C1 accesses the content. This implies that the cached content may be moved from S19 to S16.

With content caching the system has to ensure the content is up-to-dated. For this reason a content refresh mechanism is deployed. By this mechanism there are at least two possibilities of handling the refreshment of data. By the first possibility the original server sends an updated version of the content along the tree by considering pointers. Because of the fact that a server initializes this mechanism it is called a push-based mechanism. In contrary to this, in the so-called pull-based mechanism a cache engine initiates the cache refresh procedure either indirectly based on a client request or by a timeout started in the cache engine. The refresh request is handled like any other content request from a client.

For each cached content, access statistics, for example the number of accesses per time unit and the number of hosts for a content can be used to collect access characteristics. In its simplest form this is a counter per subtree and a counter per higher cache engine that accesses the content. This statistics allow the determination of the location of the content within the hierarchical tree. In case that for example only clients from a specific sub-tree access the content, it can be decided to move the cached content down but in order to serve better the multitude of accesses from different subtrees it can be decided to move the content upper.

In the following the move of a cached content is described in respect with FIG. 4. Similar to FIG. 3 this architecture contains routers S101 to S123 and clients C11 to C17. It is assumed that every router includes cache engine functionality.

Figure 4:
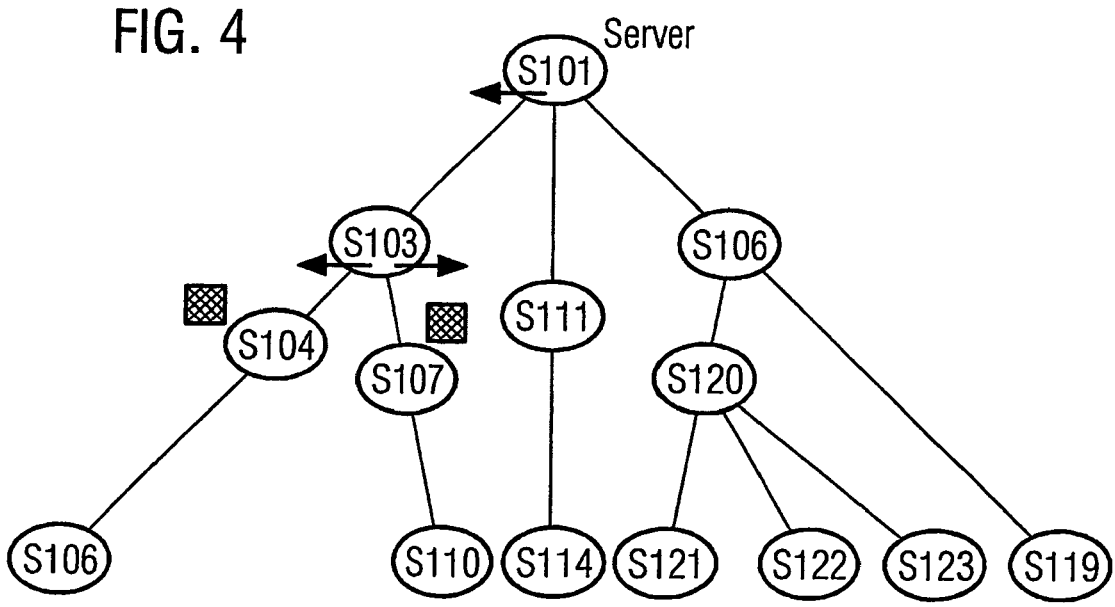
FIG. 4 shows an embodiment of the invention.

With respect to FIG. 4 the assumption is made that a content is cached in the router S110. In case that the most accesses originate from the router S106 and go via the router S103 a decision could be made to move the cached content to S103. In this case both sub trees are served by this content. The performing of the movement of the cached content to the router S103 can be done when the cached content is fetched from the router S110. In this case the router S110 removes the content and indicates to the router S103 that it should cache the content.

Similarly, if it is determined that all requests are coming from the router S106, the router S103 can decide to sent the cached content either to the router S104 or to the router S106. Moving the content to the router S104 implies that the clients from the router S110 can still relatively fast access the content, whereas moving the content to the router S106 optimizes the access for the clients from the router S106. Whether to move the content to the router S104 or S106 depends on the access statistics. Moving cached content down the tree is either done by moving it to the next cache engine or to the cache engine, which is a leaf of the subtree, i.e. it does not have further subtrees with a cache engine. In both cases a dedicated point-to-point message is sent to the corresponding cache engine that it has to store the subsequent arriving content when it is received later.

The movement of a content leads to storing of pointers to the determined location in the corresponding nodes. In a preferred embodiment there are tow solutions for management of the pointers. In case the content is stored in S104 then with the first solution a pointer at S103 in S101 is stored, showing the direction in the tree. It means in order to determine the S104 location a retrieval message is to be send down the tree according the pointers in the passed nodes. In the proposed second solution beside the pointer showing the direction within the tree also a pointer to the cache engine is stored. In respect to FIG. 4 the server S101 stores the pointer to S103 and pointer to S104 and S107, in case of replicated content. The management of the pointers includes also the necessarily of updating the pointers in the corresponding nodes in order a content is moved.

In order to perform the movement of a content the corresponding address of the node, in which the content will be stored, is to be found. For this purpose the cache engine having the content sends a message down the tree, indicating that it wants to fetch the address of the next cache engine or the leaf of the cache engine. The next cache engine is the first one, which receives the message and as result it returns its address and terminates the message or the message is forwarded to a next cache engine.

For example, a request message for the corresponding leaf of the tree having the cache engine is forwarded by each cache engine that has cache engines subtrees connected until a cache engine is reached which does not have any subtrees. That cache engine terminates the message and returns its address. In case of multiple leafs in subtrees, the correct leaf with the cache engine is determined by including the client address for example an IP address in the request message. This address is then used by a cache engine with multiple subtrees to determine the correct subtree in order to reach the correct cache engine leaf.

Another possibility for finding the location of the cache engine in the topology may be to use the information available from the administration or the configuration of the network.

Besides moving of a cache content it may also be decided to replicate the cached content because multiple branches regularly access the content.

FIG. 4 is used to describe an embodiment of the invention with a replicated content.

Considering the replication possibility of the contents different scenarios can be distinguished.

In the first scenario all subtrees contain the cached content. This requires storage of an indication about this in order to determine the location of the cached contents in the tree. This is needed for performing a push-based cache refresh mechanism. This is also needed to serve requests coming from nodes higher up in the tree. With the present invention it is ensured that the replication among all subtrees is delegated and controlled, for example due to the management of pointers.

In the other scenario having the possibility of content replication only some of the subtrees contain the cached content. In this case a pointer per subtree with the cached content is to be stored in order to determine the content in case a cache refresh is to be done or the content is to be fetched. In order to control an overload of a cache engine due to a great number of accesses a load balancing mechanism can be used. With this mechanism the request messages for accessing are distributed among all the cache engines, which have the requested content.

The selection of the best possible cache engine having the requested content can be done by taking onto consideration for example the link characteristics, such as distance, delay or bandwidth. In fact the most optimal solution is with the shortest path to the content. In order to retrieve the nearest cache engine with the required content anycasting can be applied.

With respect to FIG. 4 the replication of a cached content can be performed in router S103 when the subtrees with the routers S104 and S107 on the top often request this content. In that case the cached content can be replicated to S104 and S107. The cached content could also be replicated to one of the leaf networks instead, for example to S106 or S110, when according to the statistics it has been decided that these are the appropriate routers for placing the cached information.

In case cached content is replicated, there are two ways to combine replicated cached content. Combination of replicated cached content includes deleting of one replication and combining of the access statistics from the location having the replicated content. In the first case, when merely some subtrees contain a cached content and the content is regularly requested by one of the subtrees without the cached content then the cache engines with the cached content may determine that the cached content should be moved to a higher level in the tree. This corresponds to the push-based concept. Also the root of the subtrees where all pointers are stored can take the decision of combining according to the pull-based concept.

Another way of combining the replicated cached information is that at each cache refresh a root of a subtrees decides to keep the content itself and inform the cache engines with the replicated cached content that these should delete the cached content.

Also in case of the replicated cached content a cache refresh mechanism has to be designated. As mentioned above there are two ways of performing this, the push-based mechanism and the pull-based mechanism. Although a push-based cache refresh mechanism is more efficient for replicated cached content, because the refreshing is performed simultaneously for multiple cache engines. It is possible to use a pull-based cache refresh mechanism. In case of a pull-based cache refresh for replicated cached content the following refresh mechanism can be applied. When caching the content each cache engine determines a random wait time for waiting after the cached content is outdated. Since each cache engine will have a different value, there is only one cache engine that requests a cache refresh from the original server. This cache refresh is then sent to all cache engines with the cached content.

In the second alternative for performing a refresh mechanism for replicated cached content the cache engine being on the highest level and containing pointers to the other cache engines will be responsible for requesting a cache refresh from the original server. The cache refresh is then sent to all cache engines that contain the cached content.

The replication, combination or refreshment operations are to be considered by the evaluation of the statistics. Whenever cached content is replicated or combined, the corresponding access statistics have to be either aggregated or decreased and transferred accordingly. Whenever cached content is refreshed, the old access statistics should be copied accordingly.

The decision either to move the cached content down the caching tree or to replicate the cached content depends on several aspects such as for example the size of the cached content, the number of clients and accesses per time unit, the distance improvement when moving the cached content closer to the clients. For example in case when clients in two subtrees are accessing the cached content regularly. According to the content provider the content of the data is changed on average once a week, which results in a cache refresh rate of once an hour as decided by the network operator or the content provider. In order to decide whether the data should be replicated to both subtrees or whether it should be kept in the root of those subtrees for serving both subtrees at a further distance, an efficient algorithm is to be applied. This algorithm may take the distance to the clients, the size of the content, the cost of moving the cached content, the refresh rate, the number of messages on average required to refresh the cached content, the available capacity in the cache engines and several other aspects into account. Information from the other cache engines may be fetched with the inter cache engines communication protocol, like the above described dedicated point to point protocol.

An even more advanced decision criterion may consider partitioning the cached content based on accessing statistics. When the cached content is moved down the caching tree, a pointer to the cached content is stored at branching points, for example in the routers with multiple sub-trees, the routers S16 and S20. This means when the content is cached in the router S19, the router S16 stores a pointer to the cached content in the router S119. This can be a pointer to the router S119 or just a pointer to the sub-tree where the router S119 is contained.

For the caching mechanism a replacement policy is applied in order to keep the cache size limited. For this purpose a remove of the content with the existing mechanisms, like for example the least recently used cached content is removed or the cached content is removed after a certain time period or when no cache update information is received. A dedicated cache removal message may also be send by the original server.

Optionally, the root of the tree, for example the server S1, stores all the pointers to the content in order to efficiently use resources when cache updates messages are sent by the original server. These pointers are also used to move cached contents higher up in the tree or to delete cached contents when a new cached content copy is created higher up in the tree.

The distance information from the routing protocols can also be used to determine whether the content should be cached at all. Whenever the original server is accessed, it can be determined what is the distance to the client. In case the distance is not too high, it may be decided whether the content should be cached closer to the client or whether no caching should be done at all. By the decision historical or forecasted content accessing information can be taken into account.

The invention allows dynamic performing of caching within a hierarchical architecture saving network resources. The dynamic of the present invention is based on the possibility of determining the location of a cached content according to the evaluated access statistics.

The invention claimed is:

1. A method for dynamically managing cached information in a communication network with network nodes related in a hierarchical architecture with at least one server on the top, at least one host at the bottom of the hierarchical architecture and with at least one cache engine for caching the information between the at least one server and the at least one host, comprising:
   establishing access statistics for the cached information at a location within the hierarchical architecture;
   responsive to receiving a request for the cached information from the at least one host, checking the access statistics of at least one other location; and
   evaluating the access statistics of both locations to determine the location of the cached information relative to the at least one host and nearby hosts;
   optimizing access for the at least one host and nearby hosts by moving the cached information up or down within the hierarchical architecture;
   accessing the cached information by
   the at least one host sending a request message for information towards at least one server;
   the next passed cache engine checking if it has the requested information;
   the requested information, being available, is returned and the access statistics of the information by other hosts is checked, whereupon a decision is taken and the next passed cache engine having a pointer to the location of the requested information, forwarding the request message to the location of the requested information, else the requested message being forwarded to a next cache engine and
   retrieving the information from the location closest to the at least one host.

2. The method according to claim 1 wherein the access statistics are evaluated either in the cache engine or in the at least one server or in a router, which is responsible for routing information within the hierarchical architecture.

3. The method according to claim 1, wherein the cached information is replicated within the hierarchical architecture.

4. The method according to claim 1, in case the determination of the location results in changing the location, the cache engine stores a pointer to the location of the information.

5. The method according to claim 1, wherein the access statistics consider the number of accesses per time unit and the number of hosts for a content.

6. The method according to claim 1, wherein the access statistics consider distance and priority of the locations.

7. The method according to claim 1, wherein a cache engine closest to the host adds to a request message for information sent from the host towards the at least one server an indication indicating the wish for caching the information.

8. The method according to claim 7, wherein a next passed cache engine, which is passed by the request message on the way towards the at least one server, overrules the indication.

9. The method according to claim 1, wherein the pointer to the location of the information is accompanied with any additional information from a group comprising caching time, cache refresh rate and a distance indication to the cache engine being located lower in the hierarchical architecture.

10. The method according to claim 1, wherein in case a cache engine has the pointer to the location of the information, the distance to the cache engines having the cached information is compared with the distance to the at least one server and in case the distance to the at least one server is shorter then the information is fetched from the at least one server.

11. The method according to claim 1, wherein the cached information includes an information indicating the likelihood that the cached content is changed within a certain time period.

12. The method according to claim 1, wherein in order to update the cached information a refresh mechanism is carried out.

13. The method according to claim 12, wherein the refresh mechanism is a push-based mechanism initiated by the at least one server.

14. The method according to claim 13, wherein the at least one server sends an updated version of the content along the hierarchical architecture by taking into consideration the pointers of the location of the information.

15. The method according to claim 12, wherein the refresh mechanism is a pull-based mechanism initiated by at least one cache engine.

16. The method according to claim 1, wherein an information indicating the likelihood that the cached content is changed within a certain time period is considered.

17. The method according to claim 16, wherein sending an additional message to the cache engine or automatically when it is outdated does a removal of the cached information.

18. The method according to claim 17, wherein the establishment of the hierarchical architecture is done with a multicast and a corresponding multicast delivery tree topology.

19. The method according to claim 18, wherein the establishment of the hierarchical architecture is done with a routing protocol in order to get access to information about the route between the at least one server and the clients.

20. The method according to claim 19, wherein the routing protocol is a distance vector routing protocol containing a table with the shortest paths to all nodes within a network.

21. The method according to claim 1 the communication between two network nodes is based on a point to point protocol.

22. A network node, comprising digital processing unit and memory, adapted to dynamically manage cached information in a communication network with said and further network nodes related in a hierarchical architecture with at least one server on the top, with at least one host at the bottom of the hierarchical architecture and with at least one cache engine for caching the information between the at least one server and the at least one host, the network node comprising:
- a collecting means for collecting data about the usage of the cached information within the hierarchical architecture,
- a statistics means for determining of access statistics for the cached information from at least one other location;
- an analysis means for evaluating the access statistics of both locations to determine the location of the cached information relative to the at least one host and nearby hosts, wherein optimizing the location of the cached information moves the cached information up or down within the hierarchical architecture, and the cached information is accessed by:
  - the at least one host sending a request message for information towards at least one server;
  - the next passed cache engine checking if it has the requested information;
  - the requested information, being available, is returned and the access statistics of the information by other hosts connected to the next passed engine is checked whereupon a decision is taken and the next passed cache engine having a pointer to the location of the requested information, forwarding the request message to the location of the requested information, else the request message being forwarded to a next cache engine; and
- a retrieval means for retrieving the information from the location closest to the at least one host.

23. The network node according to claim 22, wherein the network node is one of the server, the cache engine and a router for routing purposes within the hierarchical architecture.

24. A system comprising a digital processing unit and memory and adapted to dynamically manage cached information in a communication network with network nodes related in a hierarchical architecture with at least one server on the top, with at least one host at the bottom of the hierarchical architecture and with at least one cache engine for caching the information between the at least one server and the at least one host, and the system includes network nodes, wherein each network node comprises:
- a collecting means for collecting data about the usage of the cached information within the hierarchical architecture;
- a statistics means for determining access statistics for the cached information from the collected data and
- an analysis means for evaluating the access statistics of both locations to determine the location of the cached information relative to the at least one host and nearby hosts, wherein the optimization of the location of the cached information results in moving the cached information up or down within the hierarchical architecture, and wherein in order to access the cached information the following steps are to be performed:
  - the at least one host sends the' request message for information towards the at least one server,
  - the next passed cache engine checks if it has the requested information,
  - in case of having the information available, this information is returned and the access statistics of the information by other hosts connected to this cache engine is checked, and
  - considering the result a decision about the location of the information is taken, and
  - in case the next passed cache engine has the pointer to the location of the information, the request message is forwarded to the location of the information, else the request message is forwarded to the next cache engine; and
- retrieval means for retrieving the information from the location closest to the at least one host.

25. The system according to claim 24 wherein the hierarchical architecture has a form of a tree with at least one server on the top of the tree, with at least one host as a leaf of the tree, and in-between with at least one router and with at least one cache engine, which stores cached information and is connected to a corresponding router.

* * * * *